US012586057B2

(12) United States Patent
Kanwar et al.

(10) Patent No.: US 12,586,057 B2
(45) Date of Patent: Mar. 24, 2026

(54) STORE PROXIMITY-BASED SYSTEM FOR CONTACTLESS TRANSACTIONS

(71) Applicant: MASTERCARD INTERNATIONAL INCORPORATED, Purchase, NY (US)

(72) Inventors: Ravi Kanwar, Bahadurgarh (IN); Avinash Upadhyay, Noida (IN); Jaipal Singh Kumawat, Sikar (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 131 days.

(21) Appl. No.: 18/406,565

(22) Filed: Jan. 8, 2024

(65) Prior Publication Data

US 2025/0225501 A1     Jul. 10, 2025

(51) Int. Cl.
  *G06Q 20/34*       (2012.01)
  *G06Q 20/40*       (2012.01)
(52) U.S. Cl.
  CPC ....... *G06Q 20/352* (2013.01); *G06Q 20/4015* (2020.05)
(58) Field of Classification Search
  None
  See application file for complete search history.

(56) References Cited

U.S. PATENT DOCUMENTS

2015/0324823 A1   11/2015  Unser et al.
2017/0178189 A1   6/2017  Hu et al.

2020/0005295 A1*  1/2020  Murphy ............... G06Q 20/405
2021/0012322 A1*  1/2021  Manchanda ......... G06Q 20/352
2021/0056574 A1*  2/2021  Song .................. G06Q 20/4016
2023/0401582 A1*  12/2023  Roundy ............ G06Q 30/0201

FOREIGN PATENT DOCUMENTS

WO      2018024980 A1    2/2018
WO    WO-2023230456 A1 * 11/2023  ......... G06Q 20/3224

OTHER PUBLICATIONS

US 12,361,424 B2, 07/2025, Benkreira (withdrawn)*

* cited by examiner

*Primary Examiner* — Paul S Schwarzenberg
(74) *Attorney, Agent, or Firm* — Barta Jones, PLLC

(57)                ABSTRACT

Examples provide improved methods for authorizing contactless payment card transactions based on merchant proximity. Examples include identifying two historical card-present transactions that occur within a time interval using the same payment card and creating a merchant proximity pair that includes the two identified merchant locations. A first card-present payment card transaction using a first payment card at the first merchant location is authorized. After a contactless payment card transaction that uses the same payment card is received, this transaction is authorized if the first merchant location and the second merchant location are in a merchant proximity pair together, and if the contactless payment card transaction occurs within a time interval of the earlier transaction, thereby avoiding a decline of the contactless payment card transaction.

20 Claims, 6 Drawing Sheets

CARDHOLDER OPT-OUT (MERCHANT PROXIMITY FEATURE)

PERMITTED RANGE 316A

0$     $50     $100

SOFT LIMIT 312     HARD LIMIT 314

310

302

CARDHOLDER OPT-IN (MERCHANT PROXIMITY FEATURE)

PERMITTED RANGE 316B

0$     $50     $100

SOFT LIMIT 312     HARD LIMIT 314

320

302

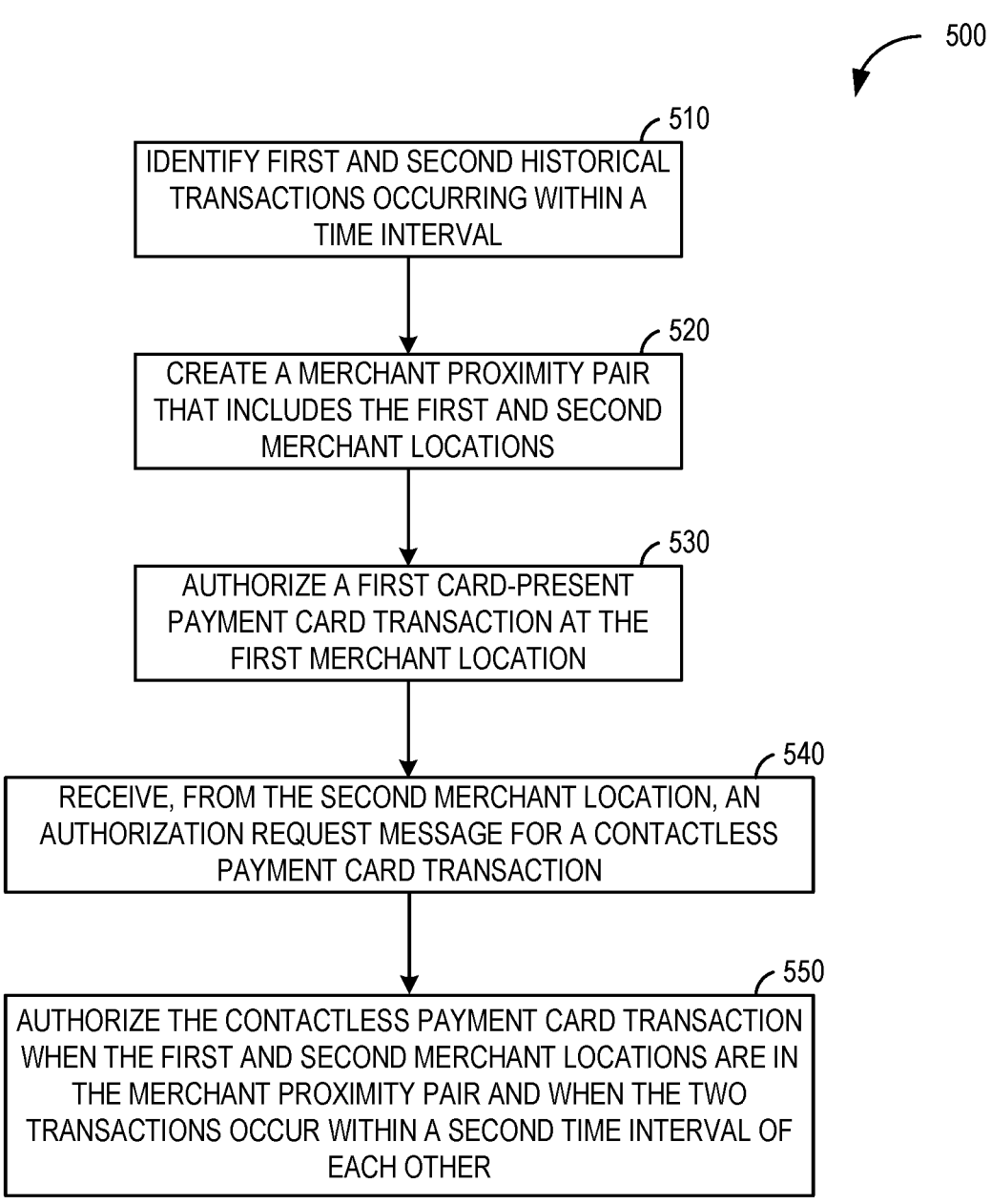

500

510
IDENTIFY FIRST AND SECOND HISTORICAL TRANSACTIONS OCCURRING WITHIN A TIME INTERVAL

520
CREATE A MERCHANT PROXIMITY PAIR THAT INCLUDES THE FIRST AND SECOND MERCHANT LOCATIONS

530
AUTHORIZE A FIRST CARD-PRESENT PAYMENT CARD TRANSACTION AT THE FIRST MERCHANT LOCATION

540
RECEIVE, FROM THE SECOND MERCHANT LOCATION, AN AUTHORIZATION REQUEST MESSAGE FOR A CONTACTLESS PAYMENT CARD TRANSACTION

550
AUTHORIZE THE CONTACTLESS PAYMENT CARD TRANSACTION WHEN THE FIRST AND SECOND MERCHANT LOCATIONS ARE IN THE MERCHANT PROXIMITY PAIR AND WHEN THE TWO TRANSACTIONS OCCUR WITHIN A SECOND TIME INTERVAL OF EACH OTHER

STORE PROXIMITY-BASED SYSTEM FOR CONTACTLESS TRANSACTIONS

BACKGROUND

With payment card transactions, card present transactions refer to in-person payment transactions where a physical payment card is used to make a purchase at a point of sale (POS) device. These transactions typically involve one of three primary technologies, namely magnetic stripe (mag-stripe), chip technologies (e.g., Europay, Mastercard, Visa (EMV) chips or the like), and contactless technologies (e.g., near field communication (NFC), Radio-Frequency Identification (RFID), or the like).

Magstripe cards utilize a magnetic stripe on the back of the payment card. The magnetic stripe contains static, encoded customer information that is read when swiped in a card reader of the POS device. EMV chip cards are equipped with a small microchip that generates a unique transaction code for each purchase, adding an additional layer of security. The microchip on the EMV chip cards contains dynamic data, including encryption keys and unique transaction information, making it much harder for fraudsters to clone or counterfeit payment cards.

Contactless cards, on the other hand, are designed for wireless communication and data exchange when brought into proximity with a POS device. NFC cards, for example, have an embedded NFC chip and antenna. The chip contains hardware and software that facilitates communication with an NFC-enabled POS devices (e.g., an NFC reader device). The antenna allows the card to transmit and receive data wirelessly. NFC cards are passive devices, meaning that an NFC card does not actively transmit data until it is brought into proximity with an NFC reader device. When an NFC card is held close to an NFC reader device, the card draws power from an electromagnetic field generated by the reader device to perform a transaction. Where magstripe-type cards and chip-type cards are used to perform contact-based payment card transactions, as the payment card makes physical contact with the POS device, contactless cards such as NFC cards are enabled to perform transactions with the POS device when brought into proximity of the reader, and do not necessarily rely on making physical contact between the POS device and the payment card.

NFC technology incorporates security measures to protect data during transmission. For example, encryption and authentication protocols may be used to ensure the privacy and integrity of the data being transmitted. For example, when making a contactless payment, the NFC card and the POS terminal exchange encrypted data to complete the transaction securely.

However, contactless cards are not without security issues. The contactless nature of their use creates the potential for data to be stolen without the card being physically manipulated by the cardholder. There are several known ways that contactless cards can be compromised. For example, in data interception attacks, a malicious device intercepts the signals of the card and the card reader to steal transmitted data. Data modification attacks are similar to data interception attacks, but instead of just stealing the data, the transmitted data is modified during the exchange (e.g., altering the payment amount, redirecting the payment to a different recipient). Card cloning attacks involve a malicious device wirelessly acquiring the data from the card, thus allowing the malicious device to make transactions as if the malicious device were the legitimate card. Skimming attacks utilize a malicious device positioned near or on a POS device to copy data transmitted between the card and the POS device.

Given some of the potential security risks introduced by such contactless technologies, financial institutions and cardholders apply a limit on the spending that is allowed via such contactless transactions. When this "contactless spending limit" is exceeded, contactless transactions may be declined, causing the cardholder to revert to the use of contact-based (or "non-contactless") transaction methods (e.g., card swipe or chip insert methods) to retry the declined transaction or for other subsequent transactions during that day.

SUMMARY

Some examples provide a system for bypassing a contactless spending limit and authorizing contactless payment card transactions based on merchant location proximity. The system includes at least one processor; and at least one memory comprising computer-readable instructions, the at least one processor, the at least one memory and the computer-readable instructions configured to cause the at least one processor to: identify, from a database of historical transactions, a first historical card-present transaction and a second historical card-present transaction occurring within a first time interval using the same payment card, the first historical card-present transaction occurring at a first merchant location, the second historical card-present transaction occurring at a second merchant location; create a merchant proximity pair that includes the first merchant location and the second merchant location based on the identifying; authorize a first card-present payment card transaction using a first payment card at the first merchant location; receive, from the second merchant location, a payment card authorization request message for a contactless payment card transaction using the first payment card; and authorize the contactless payment card transaction when the first merchant location and the second merchant location are in the merchant proximity pair and when the contactless payment card transaction occurs within a second time interval of the first card-present payment card transaction.

Other examples provide a computerized method for authorizing contactless payment card transactions. The method includes: identifying, from a database of historical transactions, a first historical card-present transaction and a second historical card-present transaction occurring within a first time interval using the same payment card, the first historical card-present transaction occurring at a first merchant location, the second historical card-present transaction occurring at a second merchant location; creating a merchant proximity pair that includes the first merchant location and the second merchant location based on the identifying; authorizing a first card-present payment card transaction using a first payment card at the first merchant location; receiving, from the second merchant location, a payment card authorization request message for a contactless payment card transaction using the first payment card; and authorizing the contactless payment card transaction when the first merchant location and the second merchant location are in the merchant proximity pair and when the contactless payment card transaction occurs within a second time interval of the first card-present payment card transaction.

Still other examples provide a computer storage medium having computer-executable instructions that, upon execution by a processor of a computer, cause the processor to at least: identify, from a database of historical transactions, a first historical card-present transaction and a second historical card-present transaction occurring within a first time interval using the same payment card, the first historical card-present transaction occurring at a first merchant location, the second historical card-present transaction occurring at a second merchant location; create a merchant proximity pair identifying the first merchant location and the second merchant location based on the identifying; authorize a first card-present payment card transaction using a first payment card at the first merchant location; receive, from the second merchant location, a payment card authorization request message for a contactless payment card transaction using the first payment card; and authorize the contactless payment card transaction based on the first merchant location and the second merchant location being in the merchant proximity pair and based on the contactless payment card transaction occurring within a second time interval of the first card-present payment card transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a flowchart of an example method for providing a merchant proximity evaluation during authorization of contactless payment card transactions.

Corresponding reference characters indicate corresponding parts throughout the drawings. Any of the figures may be combined into a single example or embodiment.

DETAILED DESCRIPTION

Figure 1:
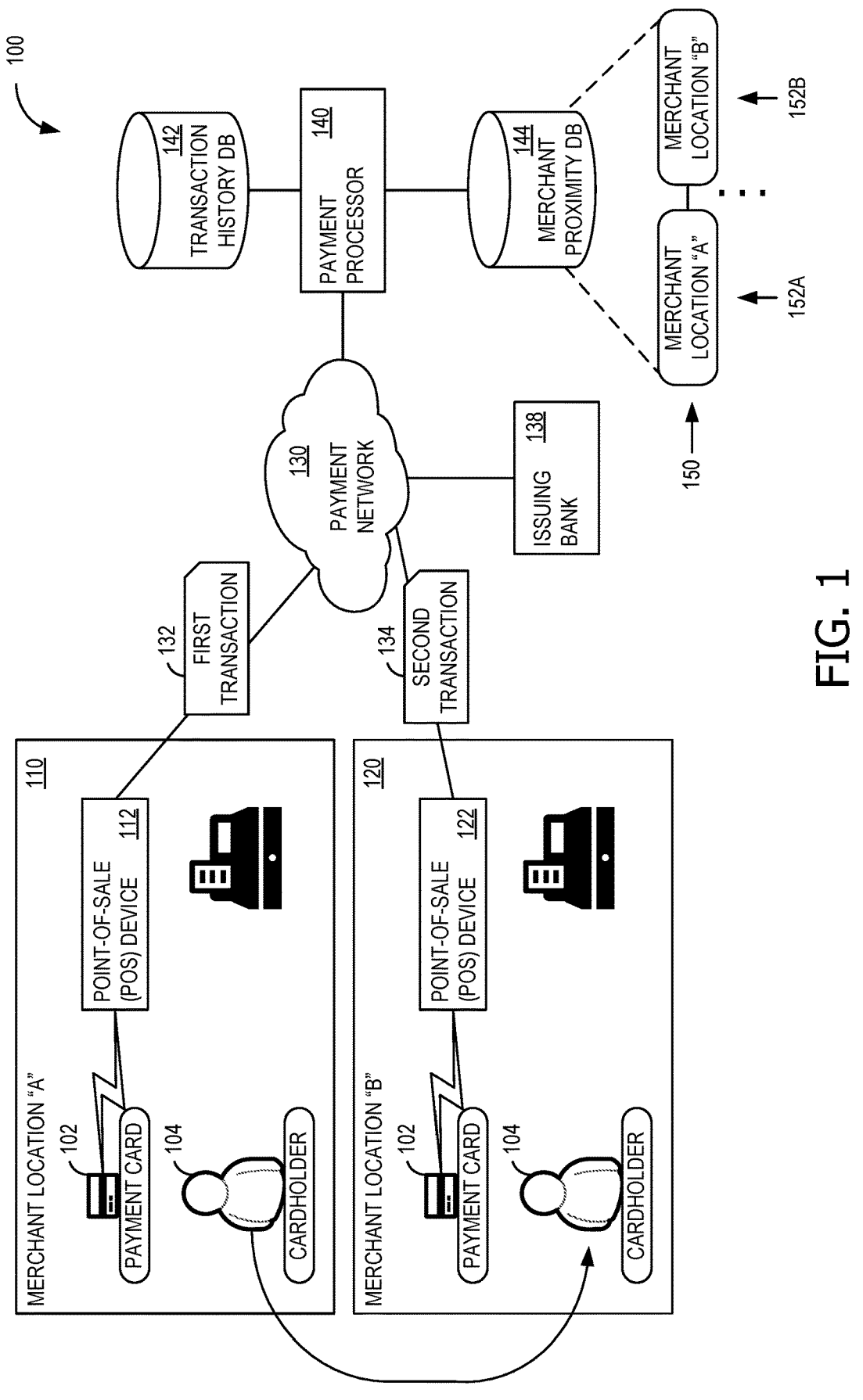
FIG. 1 is an architecture diagram illustrating an exemplary system for improving approval of contactless transactions based on merchant proximity.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

An example system discovers proximity between merchant locations (e.g., brick-and-mortar stores that are physically close to each other) and then uses that proximity determination to improve authorization of contactless transactions at those merchant locations. In examples, the system performs a proximity analysis (in a "pairing analysis phase") to generate merchant pairings between pairs of merchants. These merchant pairings are identified through analysis of historical card-present payment card transactions (e.g., where the cardholder 104 performed the transactions at the merchant locations). During this phase, the system identifies pairs of historical transactions that were performed using the same payment card, that were completed in store (e.g., via card-present transactions), and that were performed within a certain interval of time (e.g., within 30 minutes of each other). For such a pair of transactions, the system infers that the two locations associated with those two transactions are likely to be near to each other, as the cardholder was able to move between the two locations and conduct those two transactions within that interval of time. As such, the system may identify a pairing between those two merchant locations and store a record of that pairing for later use. Similarly, the system may generate many pairings between many pairs of merchants. These merchant pairings may then be used as a proxy for merchant proximity between pairs of merchants.

During an operational phase, the system uses the merchant pairings during authorization of contactless transactions in a payment network. In examples, the system enforces a "soft contactless limit" for daily transactions on any given payment card (e.g., a daily limit for contactless transactions, perhaps set by the payment network or the issuing bank). Such a hard contactless limit allows the vested parties to protect payment card accounts from potentially fraudulent contactless transactions by restricting how much can be spent on a given payment card during a given day. Further, the system also provides a customization program that allows cardholders to further restrict contactless transactions by allowing the cardholder to configure another limit (a "soft contactless limit") for their own payment card. Once configured, this soft contactless limit is then enforced by the system, thus adding greater protection against fraudulent contactless transactions on that payment card.

In examples, the system also provides a flexibility feature to the application and enforcement of these soft and hard contactless limits. More specifically, the customization program allows the cardholder to opt into a "merchant proximity feature" that can allow the soft contactless limit to be exceeded in certain circumstances. More specifically, in examples, when a transaction authorization request for a contactless transaction is received by the system for a cardholder that has opted into the merchant proximity feature, the system determines whether there has been another transaction recently performed with that particular payment card (e.g., within the last 30 minutes). If there is such a recent transaction for this payment card, the system then looks to see if the merchant locations from the current transaction and the prior transaction are paired (e.g., from the pairing analysis phase). If a pairing exists between the two merchant locations, then the system may allow the soft contactless limit to be exceeded (e.g., deferring to the hard contactless limit). Such a situation implies that the current cardholder has recently performed another transaction at another nearby merchant location, and thus the current transaction is more likely to be non-fraudulent. This conditional flexibility allows the current contactless transaction to be approved (e.g., to avoid being declined due to the more restrictive soft contactless limit).

The conventional computing device operates in an unconventional manner at least by identifying pairs of historical card-present transactions that occurred within a particular time interval using the same payment card and creating merchant proximity pairs for the two merchant locations from those pairs of transactions. These merchant proximity pairs are then used (e.g., as a proxy for merchant location proximity) to authorize a contactless transaction when a particular cardholder has recently performed a prior transaction at a merchant location that is paired with a current merchant location (e.g., based on the merchant proximity pairing). Such a feature allows the system to avoid a decline of the current contactless transaction and the need to perform a second (e.g., contact-based) transaction to complete the current purchase being attempted by the cardholder. Avoiding these declines and additional contact-based transactions improves the functioning of the computing resources of the payment network by, for example, reducing the total number of transactions being attempted on the payment network, thereby reducing the computational processing requirements of computing devices on the network (e.g., as the devices analyze fewer total transaction attempts because of this system) and reducing the storage and network data usage on the payment network (e.g., as fewer total transaction request messages are transmitted and stored across the payment network because of this system).

FIG. 1 is an architecture diagram illustrating an exemplary system 100 for improving usage of computing resources during approval of contactless transactions, based on merchant proximity. In an example, the system 100 is configured to determine proximity between various merchant locations (e.g., physical stores) and to use the determination of that proximity during authorization of contactless transactions. More specifically, a payment processor 140 analyzes historical payment card transactions to determine merchant locations that are near to each other (e.g., based on timeliness between card-present transactions of various cardholders) and then uses that merchant proximity to approve some contactless transactions that may otherwise have been declined. This functionality is referred to herein as a "merchant proximity feature" and may include both a pairing analysis phase (e.g., in which pairings 150 of merchant locations are determined, representing perceived proximity between two merchant locations) and an operational phase (e.g., in which those pairings 150 may be used to evaluate contactless transactions during transaction authorization).

In the example, historical payment card transactions are stored in a transaction history database (DB) 142. The payment processor 140 analyzes card-present payment card transactions from the transaction history database 142 to identify merchant locations that are potentially near to each other based on individual cardholders performing transactions close in time to each other at two locations.

For example, consider merchant location "A" 110 and merchant location "B" 120, each of which has a point-of-sale (POS) device 112, 122, respectively, that is used to complete payment card transactions. In this example, it is presumed that merchant locations 110, 120 are retail "brick and mortar" stores that happen to be geographically located within a few miles of each other such that cardholders 104 can transit between the locations 110, 120 within a given window of time (e.g., by walking or driving the short distance). Such proximity may tend to cause various cardholders to shop at both locations 110, 120 during the same shopping trip (e.g., as a personal time efficiency). However, the payment processor 140 may not have physical location data about the merchant locations 110, 120 (e.g., satellite information, street address location, or the like).

In these examples, the system 100 infers proximity of these two merchant locations 110, 120 through analysis of historical transactions, and more specifically when individual cardholders 104 present the same payment card 102 (e.g., in card-present transactions) at both locations 110, 120 within a particular interval of time (e.g., within 15 minutes, within 30 minutes). The timeliness of two card-present transactions at these two merchant locations 110, 120 suggests that the individual cardholder 104 was physically able to move between those locations 110, 120 within that time interval, and thus those locations 110, 120 are likely to have some degree of geographic proximity. This particular time interval is a predefined length of time referred to herein as an "analytic transaction interval" (ATI).

As such, during a pairing analysis phase, the payment processor 140 analyzes the transaction history database 142 to identify pairings 150 (or "pairs" or "merchant proximity pairs") between merchant locations, such as merchant locations 110, 120. To determine such proximity between locations 110, 120, the payment processor 140 scans the transaction history database 142 searching for pairs of transactions that are performed (A) using the same payment card, (B) in card-present transactions, and (C) within the ATI (e.g., where the two transactions are within 30 minutes of each other). Each of these historical card-present transactions can be performed via a card swipe of the payment card 102 (e.g., as with magnetic stripe-enabled payment cards), a card insert of the payment card 102 (e.g., as with microchip-enabled payment cards), a contactless transaction (e.g., as with NFC or RFID-enabled payment cards, mobile device/mobile wallet-based transactions), or any other type of transaction technology in which the payment card 102 is considered present at the POS device 112, 122.

For each identified pair of transactions, each transaction includes an identifier (ID) that can be associated with a particular merchant location 110, 120, or can otherwise be used as a proxy for a particular merchant location 110, 120. For example, each POS device 112, 122 may have a unique identifier (e.g., a terminal identification number) that can be used as a unique merchant location 110, 120 when evaluating pairings, or each POS device 112, 122 may be assigned to a store ID or the like that identifies a unique merchant location 110, 120. As such, each of these pairs of transactions involves or can otherwise be associated with a first location ID (e.g., merchant location "A" 110 of one of the transactions) and a second location ID (e.g., merchant location "B" 120 of the other transaction), or vice versa.

When such a pair of transactions is identified in the transaction history database 142 during this pairing analysis phase, the payment processor 140 creates a location pairing 150 between the two identified merchant locations "A" and "B" 110, 120. This pairing 150 is stored in a merchant proximity database 144 for late use during authorization of future payment card transactions. Each pairing 150 thus includes at least a first merchant location 152A (e.g., merchant location "A" 110) and a second merchant location 152B (e.g., merchant location "B" 120). Further, each pairing is treated as order independent, meaning that a pairing 150 of, for example, {merchant location "A" 110, merchant location "B" 120}, is equivalent to {merchant location "B" 120, merchant location "A" 110}, and thus may create only one pairing 150 for all historical transactions involving the two locations 110, 120 (e.g., regardless of which location 110, 120 happened to have the first or second transaction in the pair).

As such, during this pairing analysis phase, the payment processor 140 similarly may identify numerous paired transactions involving the same two particular merchant locations 110, 120, and may also generate other pairings 150 for numerous other pairs of locations. In some examples, during this pairing analysis phase, the payment processor 140 is configured to identify a total number of paired transactions between two particular merchant locations 110, 120, a total number of unique cardholders performing such paired transactions, or both, and the creation of a pairing 150 between those two particular merchant locations 110, 120 is created only when the total number of paired transactions exceeds a preconfigured threshold, when the total number of unique cardholders performing such paired transactions exceeds a predetermined threshold, or both. Additional details regarding the pairing analysis phase is discussed in greater detail in relation to FIG. 2.

During an operational phase, the payment processor 140 uses the pairings 150 from the merchant proximity database 144 to authorize payment card transactions. For purposes of discussion, FIG. 1 demonstrates the operational phase by illustrating an example in which a particular cardholder 104 performs a first transaction 132 at merchant location "A" 110 using a particular payment card 102 and then performs a second transaction 134 at merchant location "B" 120 using the same payment card 102. In this example, it is presumed that both transactions 132, 134 are card-present transactions and that the second transaction 134 occurs within a period of time after the first transaction 132 (e.g., where a transaction timestamp of the first transaction 132 is within a predefined interval of a transaction timestamp of the second transaction 134, or vice versa). Further, in some examples, the second transaction 134 is a contactless transaction (e.g., an NFC-type transaction using an NFC-enabled payment card 102 or mobile device/mobile wallet of the cardholder 104).

In some examples, there may be limits placed on aspects of payment card transactions. Some limits may be imposed by the payment processor or by an issuing bank associated with the payment card. Some limits may be voluntarily set by the cardholder. Such limits can include, for example, a daily transaction limit, a per-transaction limit, or a monthly spending limit. Such limits can be configured and enforced by the system 100 regardless of the type of payment card (e.g., limits imposed regardless of whether the transaction involves a contact or contactless type payment card). Such limits are referred to herein as "contact type-independent limits" when the particular limit is independent of whether transaction(s) are performed with contact-type or contactless-type payment cards.

Some limits can be configured and enforced by the system 100 specifically on contactless-type transactions. Such limits are referred to herein as "contactless-type limits" when the particular limit is enforced on contactless payment card transactions. In some examples, the payment processor 140 is configured with a time-based contactless transaction limit for contactless-type payment card transactions. A "hard contactless limit" (or just "hard limit") can be, for example, a total spend amount that can be spent via contactless transaction(s) on a given payment card 102 within a given period of time (a "reset period," e.g., daily, weekly, monthly, or some rolling period). In this example, the issuing bank or the payment processor defines the hard contactless limit for any particular payment card 102. An issuing bank or payment processor may, for example, impose a $200 daily contactless transaction limit on a particular payment card 102. When a contactless transaction is received by the payment processor 140 that causes this hard contactless limit to be exceeded for the particular payment card 102 (e.g., when the sum of all contactless payment card transaction spend amounts exceeds $200), the payment processor 140 rejects the transaction. This hard contactless limit can be imposed on a given payment card 102 in addition to any other limits, including other contactless-type limits (e.g., a per-transaction limit on any single contactless transaction) and/or contact type-independent limits (e.g., a per-transaction limit, a daily transaction limit, a merchant category limit, a cash advance limit, an international transaction limit, or the like, regardless of whether the transaction(s) are contactless or contact-type transactions).

In addition to the hard contactless limit, the system 100 may also impose another time-based contactless transaction limit to contactless transactions, referred to herein as a "soft contactless limit" (or just "soft limit"). In examples, this soft contactless limit is a total spend amount that is less than the hard contactless limit, and that is similarly imposed on contactless transactions (e.g., like the hard contactless limit), but the soft contactless limit is implemented as a limit that may be exceeded under certain conditions. More specifically, in examples, the soft contactless limit is enforced as the total spend amount for contactless transactions allowed within the reset period unless the payment card is being used in transactions at merchant locations that are close to each other (e.g., based on pairings 150 in the merchant proximity database 144) and the transactions occur within a predefined length of time (a "proximity transaction interval" or "PTI"). In other words, the PTI is a preconfigured time interval within which two transactions of the same payment card 102 and occurring at paired merchant locations (e.g., as in the pairing 150 of merchant location "A" 152A and the merchant location "B" 152B) causes the system 100 to allow the soft limit 312 to be exceeded during the second transaction 134 (e.g., the later-in-time transaction).

For example, when the cardholder 104 performs the first transaction 132 at merchant location "A" 110, the soft contactless limit is enforced during the authorization of that transaction 132. If the first transaction 132 has a transaction amount (e.g., a purchase amount) that exceeds the soft contactless limit, then the payment processor 140 enforces that soft contactless limit and declines the first transaction 132. This decline may cause the POS device 112 to prompt the cardholder 104 to retry the first transaction 132 (e.g., perform another transaction attempt) by using a contact-based method of transaction (e.g., a card swipe or card insert). It is advantageous to avoid this decline if possible, as extra transaction attempts and declines causes additional computational processing load on the payment processor 140 and additional network traffic on a payment network 130.

However, if the first transaction 132 has a transaction amount that does not exceed the soft contactless limit, then the transaction 132 may be authorized by the payment processor 140 (e.g., presuming there are no other causes to decline the transaction 132). In this example, it is presumed that the first transaction 132 is authorized on a first attempt, and thus the cardholder 104 has completed the first transaction 132 for a transaction amount that is less than the soft contactless limit.

Subsequently, the cardholder 104 travels to merchant location "B" 120 and performs a second transaction 134 with the same payment card 102. During authorization of this second transaction 134, the payment processor 140 computes a current total contactless spend for the payment card 102. This current total contactless spend is a sum of a current transaction amount (e.g., a transaction amount of the second transaction 134) and transaction amounts of all other contactless transactions on this payment card 102 that have occurred within the reset period (e.g., within the last day, week, month, 24 hours, or the like). In this example, the current total contactless spend is the sum of the transaction amounts of the first transaction 132 and the second transaction 134.

In situations where the current total contactless spend for the payment card 102 does not exceed the soft limit, the payment processor 140 may similarly authorize this second transaction 134 (e.g., again presuming there is no other reason to decline this transaction 134). In other words, if the soft limit is still not exceeded, then the payment processor 140 does not decline the transaction 134 based on the soft contactless limit.

In situations where the current total contactless spend for the payment card 102 exceeds the soft limit, the payment processor 140 evaluates whether certain conditions for exceeding the soft contactless limit are met before determining whether or not to decline the second transaction 134 based on the soft contactless limit. More specifically, the payment processor 140 determines whether there is a recent authorized transaction on this payment card 102 that has occurred within the PTI (e.g., within the last 15 minutes or 30 minutes from the transaction time of the second transaction 134). If no recent transaction is found, then the payment processor 140 declines the second transaction 134 based on the soft contactless limit. In this example, presume that the first transaction 132 occurred ten minutes prior to the second transaction 134 and that the PTI is 30 minutes. As such, the two transactions 132, 134 have occurred within the PTI, and thus satisfy this first condition.

Further, the payment processor 140 also determines whether or not the merchant locations of the two transactions 132, 134 are paired in proximity (e.g., based on the merchant proximity database 144). More specifically, the payment processor 140 identifies the merchant location "A" 110 from the first transaction 132 and the merchant location "B" 120 from the second transaction 134. The payment processor 140 searches the merchant proximity database 144 for a pairing 150 that includes both merchant location "A" 110 and merchant location "B" 120. If no pairing is found in the database 144, then the two transactions 132, 134 have occurred at unpaired merchant locations, and thus do not satisfy this second condition. If the second condition is not satisfied, then the payment processor 140 enforces the soft contactless limit and declines the second transaction 134 based on that soft contactless limit. As above, this decline may cause the POS device 122 to prompt the cardholder 104 to retry the second transaction 134 using a contact-based method of transaction (e.g., a card swipe or card insert).

In this example, the payment processor 140 identifies a pairing 150 that has both merchant locations 110, 120 (e.g., as merchant location "A" 152A paired with merchant location "B" 152B). As such, the two merchant locations 110, 120 are considered to be within proximity, and thus this second condition is satisfied.

Accordingly, since there is a recent transaction that has occurred within the configured time period (e.g., based on satisfaction of the first condition as discussed above) and since the two merchant locations are determined to be near to each other (e.g., based on satisfaction of the second condition as discussed above), the payment processor 140 allows the soft contactless limit to be exceeded. In this example, the payment processor 140 then compares the current total contactless spend to the hard contactless limit to determine whether or not to decline the second transaction

134. If the hard contactless limit is exceeded, then the second transaction 134 is declined based on the hard contactless limit and, likewise, this decline may cause the POS device 122 to prompt the cardholder 104 to retry the second transaction 134 using a contact-based method of transaction (e.g., a card swipe or card insert). If the hard contactless limit is not exceeded, then the payment processor 140 authorizes the second transaction 134 (e.g., likewise presuming that there are no other reasons to decline the transaction 134).

As such, the system 100 avoids some transaction declines by allowing a lesser limit to be exceeded (e.g., the soft contactless limit) in situations where a recent prior transaction has occurred at a nearby merchant location, thus allowing a greater degree of confidence that the later transaction is not fraudulent. Such reduction of declined transactions is a technical improvement and a technical benefit as it saves computational processing on at least the payment processor 140 and the POS device 122, as well as reduces network consumption on the payment network 130. More specifically, when a contactless decline is issued, this causes the cardholder 104 to perform another transaction (e.g., a contact-based transaction) in order to complete their purchase. In such scenarios, this causes two transaction attempts to be sent across the payment network 130 instead of just one, and likewise two transaction authorization attempts to be evaluated by the payment processor 140 rather than just one. This also reduces cardholder frustration by avoiding an unnecessary decline and insisting that the transaction be retried via a contact-based method. Further, some cardholders may walk away after the initial decline, causing the merchant to lose the sale.

While the examples are described herein as being performed by the payment processor 140, it should be understood that other devices involved in the transaction approval process provided by the payment network 130 may perform the authorization features described herein, such as the issuing bank 138.

Figure 2:
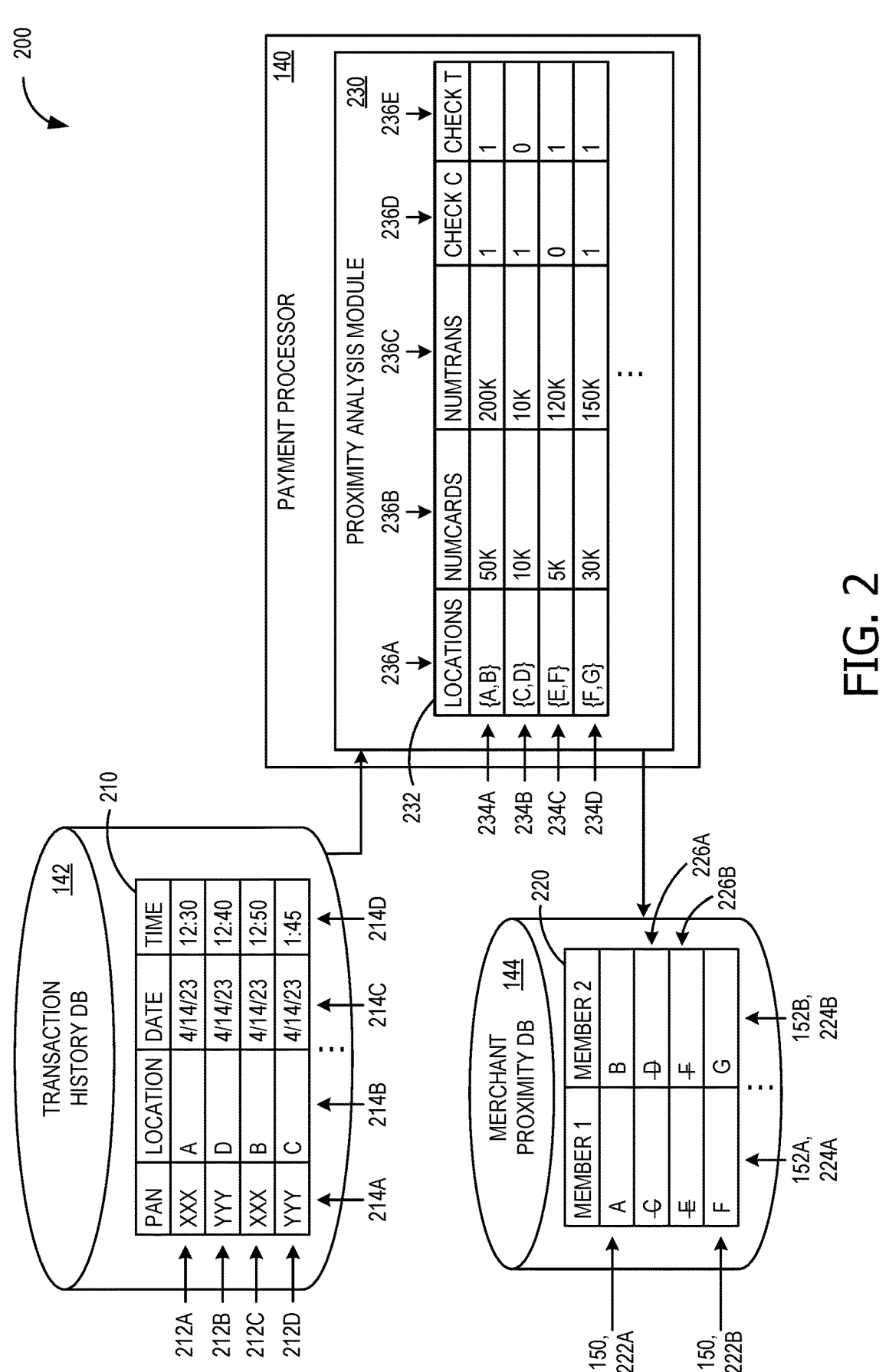
FIG. 2 is a diagram illustrating example data architecture that may be used to identify merchant location proximity during an example pairing analysis phase for example systems such as in FIG. 1.

FIG. 2 is a diagram illustrating example data architecture 200 that may be used to identify merchant location proximity during an example pairing analysis phase for the system 100 of FIG. 1. In the example, the payment processor 140 is configured to determine proximity between various merchant locations (e.g., physical stores), such as the merchant locations 110, 120 shown in FIG. 1. More specifically, the payment processor 140 uses historical payment card transactions 142 to determine merchant locations that are near to each other (e.g., based on timeliness between card-present transactions of various cardholders) and creates merchant pairs 150 in the proximity database 144 for each identified pair 150. This determination may be similar to the pairing analysis phase described above with respect to FIG. 1.

In the example, historical payment card transactions are stored in a transaction history table 210. Columns 214A-214D of the table 210 include a primary account number (PAN) column 214A, a location column 214B, a date column 214C, and a time column 214D, and may include numerous other columns (not shown here for purposes of brevity) such as terminal ID, merchant ID, transaction amount, authorization information, security data, merchant category code (MCC), customer verification method (CVM), transaction type data, and the like. In this example, the PAN column 214A is configured to store unique account identifiers associated with payment cards 102 (e.g., primary account number, or the like), the location column 214B is configured to store merchant location information (e.g., unique location IDs for merchant locations 110, 120), and the date and time columns 214C, 214D are configured to store a transaction date and time (e.g., a datetime stamp in two separate fields, as a single field, or the like). As such, each record (e.g., row) 212A-212D in the transaction history table 210 represents a successful transaction performed within the payment network 130, where the data stored in the fields of each particular row 212A-212D contain the associated details associated with that particular transaction. Further, in this example, it is presumed that each of the rows 212A-212D also represent only card-present transactions, each of which may have been performed as contactless or contact-type transactions. While only four rows 212A-212D are shown in FIG. 2 for purposes of conciseness, it should be understood that the table 210 may include any number of rows.

During the example pairing analysis phase, the payment processor 140 analyzes the card-present payment card transactions from the transaction history table 210 to identify merchant locations that are potentially near to each other. More specifically, the payment processor 140 includes a proximity analysis (PA) module 230 that is configured to execute the pairing analysis phase in conjunction with the transaction history database 142 and the merchant proximity database 144. In some examples, the PA module 230 may be configured to create the transaction history table 210, such as via a database query from a larger data structure (not separately shown) that restricts the type of rows 212A-212D included in the table 210 such as to enable the methods described herein (e.g., to only card-present transactions, to successful transactions, to non-fraudulent transactions, to transactions within a particular date range, or the like). In this example, the transactions included in the transaction history table 210 are limited to successful, non-fraudulent card-present transactions that occurred during a particular month (e.g., all such transactions from May 2023, or the like).

In preparation for this example analysis, the PA module 230 initially identifies an ATI to use for this analysis. The ATI represents a time interval (e.g., a length of time such as 15 minutes, 30 minutes, or the like) that is used to determine when two transactions of a particular payment card trigger the PA module 230 to consider the two merchant locations associated with those two transactions as possibly near each other. In other words, pairs of card-present transactions that occur within the ATI of each other (e.g., within 30 minutes between the two transactions) indicate that those two merchant locations may be close to each other, where other pairs that occur outside of the ATI of each other (e.g., longer than 30 minutes between the two transactions) may indicate that those two merchants may not be close to each other.

Further, in this example, the PA module 230 creates an analytical table 232 that is used to track aspects of this pairing analysis. The analytical table 232 includes a location pair ("locations") column 236A, a number of cards ("numcards") column 236B, a number of transactions ("numtrans") column 236C, a cards check ("Check C") column 236D, and a transactions check ("Check T") column 236E. The locations column 236A includes location information for two unique merchant locations (e.g., IDs for locations 110, 120). In this example, there are four locations used, namely locations "A", "B", "C", and "D" (e.g., as shown in the location column 214B of the transaction history table 210). Further, the locations column 236A of the analytic table 232 shows each location of a pair in set notation (e.g., a pairing of location "A" and location "B" is illustrated as "{A,B}"). Each individual location in the locations column 236A can be stored individually or they can be stored together, and each pair is treated as order independent (e.g., an unordered set, where {A,B} is equivalent to {B,A}). The numcards column 236B and the numtrans column 236C represent count totals that are created during this analysis, as described in further detail below. The "Check C" and "Check T" columns 236D, 236E are binary fields that represent whether or not one of the respective count totals (e.g., from columns 236B, 236C) exceeded an associated threshold, as described in further detail below. As such, each row 234A-234D of the analytic table 232 represents a unique pair of two merchant locations.

In the example, the PA module 230 is configured to identify potential pairs of merchant locations and then to analyze each potential pair of merchant locations to generate the count totals and checks of columns 236B-236E. To identify potential pairs of merchant locations, in one example, the PA module 230 sorts the transaction history table 210 by PAN column 214A and by date/time columns 214C, 214D. The PA module 230 then scans the sorted table 210 (e.g., sequentially) for pairs of transactions (e.g., pairs of rows 212A-212D) that have the same PAN, that have different locations, and that are within the ATI of each other (e.g., occurred within 30 minutes of each other, have a difference in timestamps of less than 30 minutes, or the like). Each such potential pair represents an instance where a particular cardholder 104 was able to physically travel between two different merchant locations and complete two card-present transactions within the ATI. For each such potential pair identified during this first stage of analysis, the PA module 230 checks whether or not that pair is already in the analytical table 232 (e.g., based on the two locations of the pair of transactions versus the locations column 236A). If that pair is not yet present in the analytic table 232, then the PA module 230 adds a new row and stores that location pair in the locations column 236A. The PA module 230 similarly identifies all such location pairs in which at least one pair of card-present transactions was performed within the ATI for at least one PAN. At the end of this first stage, the analytic table 232 includes a single row 234A-234D for each unique such pair of merchant locations.

During a second stage of analysis, the PA module 230 analyzes each of the unique location pairings in the rows 234A-234D of the analytic table 232 and populates the count totals and checks of columns 236B-236E for each row. More specifically, in the example, for each row 234A-234D in the analytic table 232, the PA module 230 identifies the two locations of the pair (e.g., from the locations column 236A). The PA module 230 then scans the transaction history table 210 to count a total number of occurrences of pairs of transactions between those two particular merchant locations within the ATI (e.g., how many times cardholders performed transactions at both locations within the time interval). This total number of transactions is stored as the numtrans column 236C for that particular row 234A-234D (e.g., for that particular pair of merchants). Further, for that same pair of merchant locations, the PA module 230 also scans the transaction history table 210 to count a total number of unique payment cards that performed such paired transactions (e.g., how many unique PANs performed those proximate transactions between those two merchants). This total is stored as the numcards column 236B for that same row 234A-234D. And likewise for each row 234A-234D of the analytic table 232 (e.g., for each unique pair of merchant locations), the PA module 230 similarly computes the totals for the numcards and numtrans columns 236B, 236C.

In the example, the PA module also identifies a threshold for the total number of unique cards (e.g., applied to numcards column 236B) and a threshold for the total number of transactions (e.g., applied to numtrans column 236C). The PA module 230 uses these thresholds to delineate when a particular potential pairing of merchant locations (e.g., from rows 234A-234D of the analytic table 232) will cause a pairing 150 to be created in the merchant proximity database 144, and thus be used by the system. These thresholds identify how many unique cards and how many total transaction are needed between a given pair of merchant locations to trigger a pairing 150 to be created between those two merchant locations (and thus subsequently used during later transaction authorization, as described in FIG. 1 and detailed further below with respect to FIG. 4).

For example, presume that a first threshold for numcards column 236B is set to 7,500 (7.5 thousand (K)) and a second threshold for numtrans columns 236C is set to 100K. As such, and for each row 234A-234D in the analytic table 232, the PA module 230 uses the totals from the numcards and numtrans columns 236B, 236C to populate the check columns 236D, 236E. More specifically, the PA module 230 compares the total in the numcards column 236B for that particular row 234A-234D to the first threshold and sets the value of the "Check C" column 236D to "1" when the total exceeds the first threshold, and "0" otherwise (e.g., as a binary representation of 'true' and 'false', respectively). Likewise, the PA module 230 also compares the total in the numtrans column 236C for that particular row 234A-234D to the second threshold and sets the value of the "Check T" column 236E to "1" when the total exceeds the first threshold, and "0" otherwise. Thus, the check columns 236D, 236E represent whether or not that particular pair of merchant locations exceeded the respective thresholds for total number of unique cards and total number of transactions.

After completing the analytic table 232, the PA module 230 then analyzes the analytic table 232 to identify which pairings of merchant locations are sufficient to turn into pairings 150 in the merchant proximity database 144. For each row 234A-234D in the analytic table 232, the PA module 230 evaluates the value of the "Check C" column 236D and the "Check T" column 236E. In the example, if both of these conditions are satisfied (e.g., if both values are "1"), then the PA module 230 creates a pairing 150 by inserting a record (e.g., a row 222A, 222B) into a proximity table 220. If either or both conditions are not satisfied, then no pairing 150 is created in the proximity table 220. In other examples, the PA module 230 may compute and use only the numcards column 236B and the "Check C" column 236D, or only the numtrans column 236C and the "Check T" column 236E, when determining whether or not to create pairings 150.

In the example shown in FIG. 2, the two pairings of rows 234B and 234C fail at least one of the checks of columns 236D, 236E, and two other pairings of rows 234A and 234D satisfy both checks. Particularly, the pairing {C,D} of row 234B exceeded the threshold number of unique cards (e.g., as embodied in the "Check C" column 236D value of one), but did not exceed the threshold number of transactions (e.g., as embodied in the "Check T" column 236E value of zero). Similarly, the pairing {E,F} of row 234C exceeded the threshold number of transactions, but did not exceed the threshold number of unique cards. As such, no pairing 150 is added to the pairing table 220 for those pairings {C,D} and {E,F}. While the proximity table 220 does show rows 226A, 226B, it should be understood that these pairs of merchant locations are not added as pairings 150, but are instead only shown in the proximity table 220 for illustrative purposes (e.g., with their locations being struck through to illustrate their exclusion). In some examples, these rows 226A, 226B may have been added at one time, and then later removed (e.g., after evaluation of the check columns 236D, 236E).

Further, as illustrated in FIG. 2, the pairings {A,B} and {F,G} are added as pairings 150 to the proximity table 220 (e.g., as rows 222A, 222B). Each of the merchant locations 152A, 152B of the pairings 150 are shown in member columns 224A, 224B of the proximity table 220. As such, the pairings 150 that are added to the proximity table 220 may then used during authorization of real-time transactions.

Figures 3A, 3B:
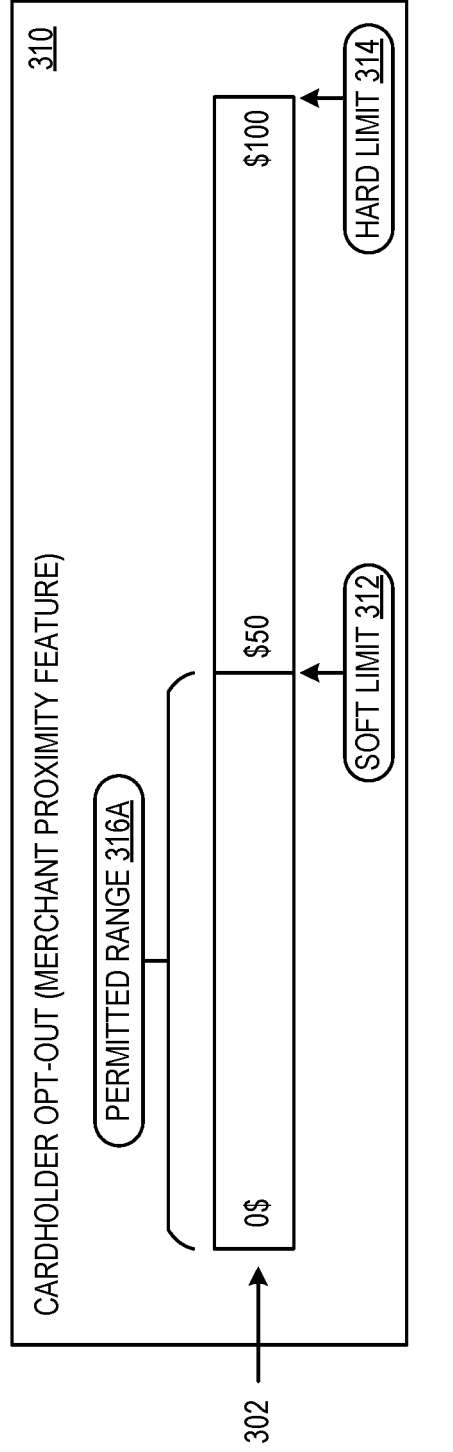
FIG. 3A and FIG. 3B are exemplary diagrams illustrating limits placed on contactless transactions for the example payment card in example systems such as in FIG. 1.

FIG. 3A and FIG. 3B are exemplary diagrams illustrating limits placed on contactless transactions for the example payment card 102 in the system 100 of FIG. 1. In these examples, the limits are enforced by the payment processor 140 during authorization of contactless transactions, such as the first and second transactions 132, 134 (shown in FIG. 1). The payment processor 140 sets a hard limit 314 on contactless transactions for the payment card 102. The hard limit 314 (e.g., $100) represents a daily limit of total spend via contactless transactions on the payment card 102 (e.g., dictated by the payment processor, the issuing bank, or the like). The soft limit 312 is a cardholder-specified daily limit of total spend via contactless transactions on the payment card 102. The cardholder 104, in these examples, has specified a soft limit 312 of $50. In some examples, the soft limit 312 and hard limit 314 may be similar to the soft limits and hard limits discussed in FIG. 1.

In these examples, the payment processor 140 enforces the hard limit 314 on daily contactless transactions for the payment card 102 by default. As such, if a contactless transaction is received that would cause the daily total contactless spend to exceed the hard limit 314 for the particular payment card 102, that transaction authorization request is declined by the payment processor 140. This may cause the cardholder 104 to be prompted to perform a contact-based transaction, which would thus not be subject to the limits 312, 314, but may be subject to other limits known in the art (not shown or discussed further here for purposes of brevity).

In addition to the hard limit 314, the payment processor 140 also provides a customization program (e.g., a system of cardholder-configurable settings and the like) that allows cardholders 104 to set a lower limit on contactless transactions (e.g., the soft limit 312). In these examples, the cardholder 104 has set the soft limit 312 at $50. When the cardholder 104 has designated a soft limit 312, the payment processor 140 may enforce that soft limit 312 similar to the hard limit 314 (e.g., declining a contactless transaction if that transaction causes the daily total spend via contactless transactions to exceed the soft limit 312).

In addition, the customization program also provides a merchant proximity feature that allows the soft limit 312 to be exceeded during authorization of contactless transactions in certain conditions. More specifically, and similar to that described above in FIG. 1, the example merchant proximity feature allows the soft limit 312 to be exceeded during authorization of a contactless transaction when the current transaction (e.g., the second transaction 134 of FIG. 1) has occurred within a time interval (e.g., the PTI, 30 minutes, or the like) of a prior transaction (e.g., the first transaction 132 of FIG. 1) and the merchant locations of the current and prior transactions are paired in the merchant proximity database 144 (e.g., as pairing 150).

In these examples, the merchant proximity feature is provided by the payment processor 140 as an optional feature within the customization program. This customizability allows the cardholder 104 to control whether or not this feature is active for their own payment card 102. In the example shown in FIG. 3A (cardholder opt-out 310), the cardholder 104 has opted out of this merchant proximity feature (e.g., the merchant proximity feature is inactive). As such, the soft limit 312 is enforced by the payment processor 140 as an upper limit for daily contactless transactions using the payment card 102 (represented in FIG. 3A as permitted range 316A on a total spend line 302).

In the example shown in FIG. 3B (cardholder opt-in 320), the cardholder 104 has opted into the merchant proximity feature (e.g., making the merchant proximity feature active). As such, the soft limit 312 is enforced by the payment processor 140 as a conditional limit. More specifically, in situations where the soft limit 312 would be exceeded by the current transaction, the payment processor 140 evaluates whether or not the conditions of the merchant proximity feature are met. In situations where those conditions are not met, the soft limit 312 is enforced and the current transaction is declined. In situations where those conditions are met, the soft limit 312 is not enforced and, instead, the hard limit 314 is enforced (represented in FIG. 3B as permitted range 316B on the total spend line 302). Additional details of this authorization analysis are discussed further below in relation to FIG. 4.

While the examples of FIG. 3A and FIG. 3B provide this merchant proximity evaluation feature as a feature of a customization program for cardholders, in other examples, this proximity evaluation feature may be configured by payment processors, issuing banks, merchant banks, merchants, or other parties to payment card transactions or combinations thereof (e.g., as assistance in reducing fraud in contactless transactions). In some examples, the PTI may be configured by the cardholder 104 (e.g., as a customizable setting to the customization program), by the payment processor, or by any of the other parties to payment card transactions.

Figure 4:
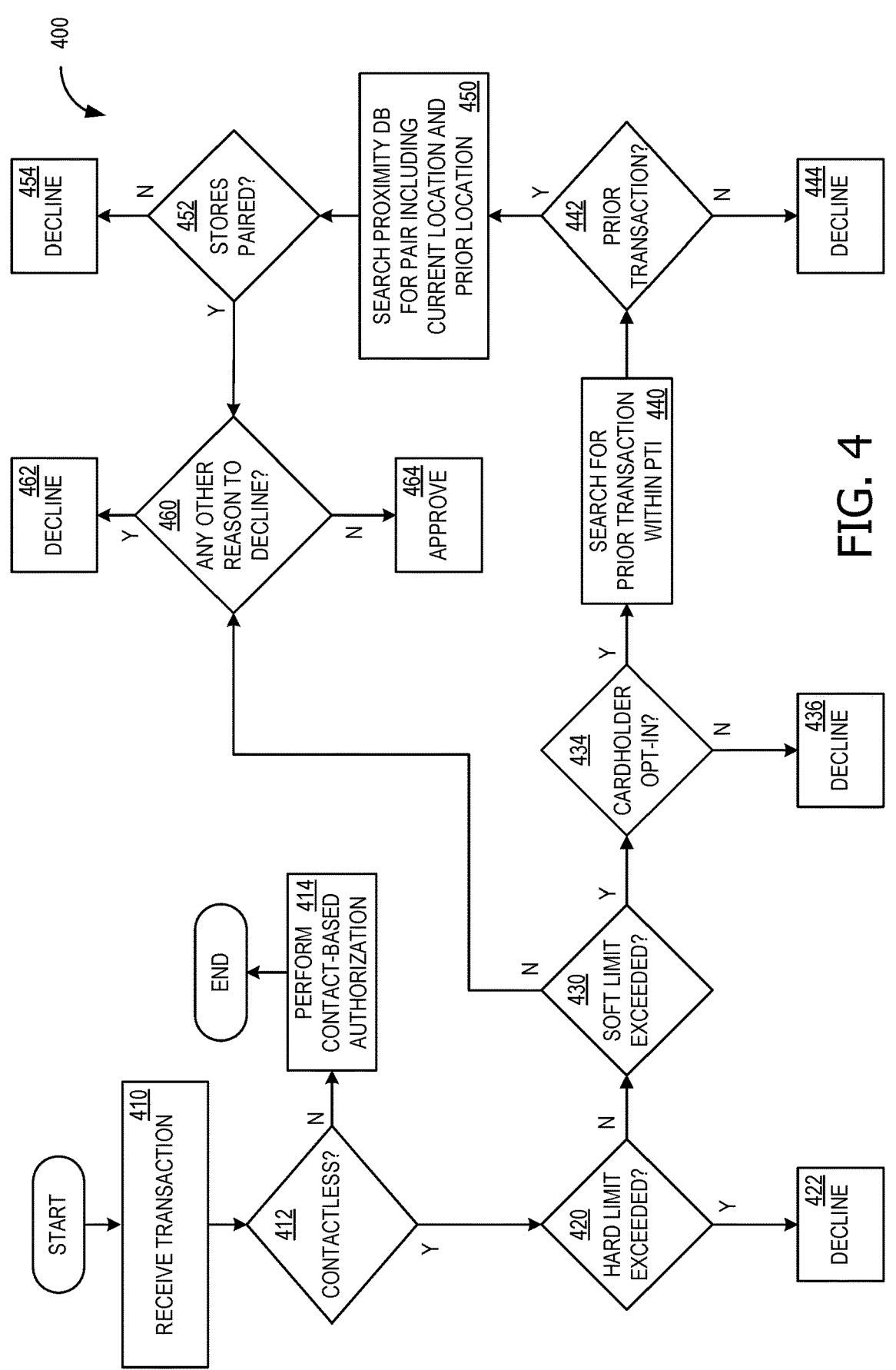
FIG. 4 is a flowchart of an example method for providing a merchant proximity evaluation during authorization of contactless payment card transactions.

FIG. 4 is a flowchart of an example method 400 for providing a merchant proximity evaluation during authorization of contactless payment card transactions. In examples, the method 400 is performed by the payment processor 140 within the system 100. For purposes of explanation, the method 400 is described herein as being performed during the operational phase described in FIG. 1, and more particularly during authorization of the second transaction 134 of FIG. 1. As such, it is presumed that the pairing analysis phase is completed (e.g., as shown and described in FIG. 1 and FIG. 2), and that the cardholder 104 has already successfully performed the first transaction 132 of FIG. 1. Further, it is presumed that both a soft limit and a hard limit are established for the payment card 102 (e.g., as soft limit 312 and hard limit 314 of FIG. 3).

In this example, the payment processor 140 receives a payment card transaction (the "current transaction," e.g., second transaction 134) at operation 410. At test 412, the payment processor 140 evaluates whether or not the current transaction is a contactless transaction. If the current transaction is not a contactless-type transaction, then the payment processor 140 performs contact-based authorization evaluation at operation 414, ending in either an authorization or a decline of the current transaction. The details of operation 414 are not relevant to the present disclosure and are thus excluded for brevity.

If the current transaction is a contactless-type transaction, then the payment processor 140 evaluates this current transaction against the limits set for the payment card 102 (e.g., the soft limit 312 and the soft limit 314) and in light of other recent transactions. More specifically, at test 420, the payment processor 140 evaluates whether or not the current transaction would cause the daily total contactless spend for the payment card 102 to exceed the hard limit 314 (e.g., by summing transaction amounts of any prior contactless transactions of the day, such as the first transaction 132, with a transaction amount of the current transaction). If the total exceeds the hard limit 314, then the current transaction is declined at operation 422.

If the total does not exceed the hard limit 314, then the payment processor 140, at test 430, similarly evaluates whether or not the current transaction would cause the daily total contactless spent to exceed the soft limit 312. If the total does not exceed the soft limit 312, then the payment processor 140 does not decline the transaction based on these contactless limits, as even the lowest limit (e.g., the soft limit 312) has not been exceeded. As such, the transaction may be approved. In some examples, the payment processor 140 performs other authorization evaluations for the current transaction beyond the operations described herein (e.g., fraud analysis, evaluation against other limits such as credit limit or the like, as is known in the art). As these other evaluations are beyond the scope of this disclosure, the example method 400 represents these other evaluations as test 460, evaluating whether there is any other reason to decline, and either declining the current transaction at operation 462 (e.g., if some other reason to decline is identified) or otherwise approving the current transaction at operation 464.

Returning to test 430, if the soft limit 312 is exceeded by the current transaction, then the payment processor 140 evaluates whether or not the cardholder 104 has opted into the merchant proximity feature (e.g., as described in FIG. 3A and FIG. 3B) at test 434. If the cardholder 104 has not elected to participate in this feature, then the current transaction is declined at operation 436 (e.g., because the soft limit 312 is enforced in this situation, as described in FIG. 3A).

If the cardholder 104 has opted into this feature, then the payment processor 140 evaluates whether or not the conditions of the feature are satisfied. More specifically, at operation 440, the payment processor 140 searches for a prior transaction for this payment card 102 that has occurred within the PTI (e.g., within the last 30 minutes of the current transaction). In this example, the second transaction 134 has occurred ten minutes after the first transaction 132 and the PTI is 30 minutes, and as such, the first transaction 132 is identified during this search.

At test 442, if no prior transaction is found, the payment processor 140 declines the transaction at operation 444. If, as in this example, there is a prior transaction found within the PTI (e.g., satisfying this first condition of the merchant proximity feature), then the payment processor 140 searches the merchant proximity database 144 for a pairing 150 that includes the merchant location of the current transaction (e.g., merchant location "B" 120) and the merchant location of the prior transaction (e.g., merchant location "A" 110). In this example, the merchant location database 144 includes the pairing 150 shown in FIG. 1, which includes merchant location "A" 152A and merchant location "B" 152B, the two locations 110, 120 of the transactions 132, 134.

At test 452, the payment processor 140 evaluates whether or not the two stores (e.g., the merchant locations 110, 120)

are paired. If no pairing 150 was found for the two merchant locations, then this second condition of the merchant proximity feature is not satisfied, and the current transaction is declined at operation 454. Otherwise, at this stage, the payment processor 140 has confirmed both that there is a prior transaction within the PTI (e.g., at operation 440) and that there is a pairing between the current and prior merchant locations 110, 120 (e.g., at operation 450). As such, the payment processor 140 allows the soft limit 312 to be exceeded via this merchant proximity feature. Similarly, the payment processor 140 evaluates other reasons to decline the transaction at test 460, but otherwise will not decline this current transaction based on these contactless considerations.

FIG. 5 is a flowchart of an example method 500 for providing a merchant proximity evaluation during authorization of contactless payment card transactions. In examples, the method 400 is performed by the payment processor 140 within the system 100, and may be similar to the merchant proximity feature described above with respect to FIG. 1 to FIG. 4. In the example, at operation 510, the payment processor 140 identifies, from a database of historical transactions (e.g., the transaction history database 142), a first historical card-present transaction and a second historical card-present transaction occurring within a first time interval (e.g., the ATI) using the same payment card, the first historical card-present transaction occurring at a first merchant location, the second historical card-present transaction occurring at a second merchant location (e.g., the rows 212B, 212D of FIG. 2).

At operation 520, the payment processor 140 creates a merchant proximity pair (e.g., pairing 150, 222A of FIG. 2) that includes the first merchant location and the second merchant location based on the identifying (e.g., the merchant location "A" 110 and merchant location "B" 120 of FIG. 1, the location "A" and location "B" of FIG. 2).

At operation 530, the payment processor 140 authorizes a first card-present payment card transaction (e.g., first transaction 132 of FIG. 1) using a first payment card (e.g., payment card 102 of FIG. 1) at the first merchant location (e.g., merchant location "A" 110).

At operation 540, the payment processor 140 receives, from the second merchant location (e.g., merchant location "B" 120), a payment card authorization request message (e.g., the second transaction 134) for a contactless payment card transaction using the first payment card.

At operation 550, the payment processor 140 authorizes the contactless payment card transaction when the first merchant location and the second merchant location are in the merchant proximity pair and when the contactless payment card transaction occurs within a second time interval of the first card-present payment card transaction.

In some examples, the method 500 further includes computing (e.g., by the payment processor 140) a sum of (i) transaction amounts for contactless payment card transactions successfully completed for the first payment card during a prior timeframe and (ii) a transaction amount for the contactless payment card transaction, and authorizing the contactless payment card transaction further comprises authorizing the contactless payment card transaction when the sum exceeds a first limit. In some examples, the first limit is configured by a cardholder associated with the first payment card. In some examples, the method 500 also includes comparing (e.g., by the payment processor 140) the sum to a second limit, the second limit being greater than the first limit, and authorizing the contactless payment card transaction further comprises authorizing the contactless payment card transaction when the sum does not exceed the second limit. In some examples, the second limit is configured by one of a payment processor and an issuing bank associated with the first payment card.

In some examples, the method 500 further includes computing (e.g., by the payment processor 140), for the merchant proximity pair, a total number of transaction pairs (e.g., numtrans column 236C of FIG. 2) from the database of historical transactions and occurring within a predefined time period, each transaction pair being two historical card-present transactions occurring within the first time interval, using the same payment card, and at the first merchant location and second merchant location, and creating the merchant proximity pair further comprises creating the merchant proximity pair when the total number of transaction pairs exceeds a predefined threshold.

In some examples, the method 500 includes computing (e.g., by the payment processor 140), for the merchant proximity pair, a total number of cards (e.g., numcards column 236B of FIG. 2) from the database of historical transactions and occurring within a predefined time period, each card being a unique payment card that has at least one transaction pair involving the first merchant location and second merchant location, and creating the merchant proximity pair further comprises creating the merchant proximity pair when the total number of cards exceeds a predefined threshold.

Exemplary Operating Environment

Figure 6:
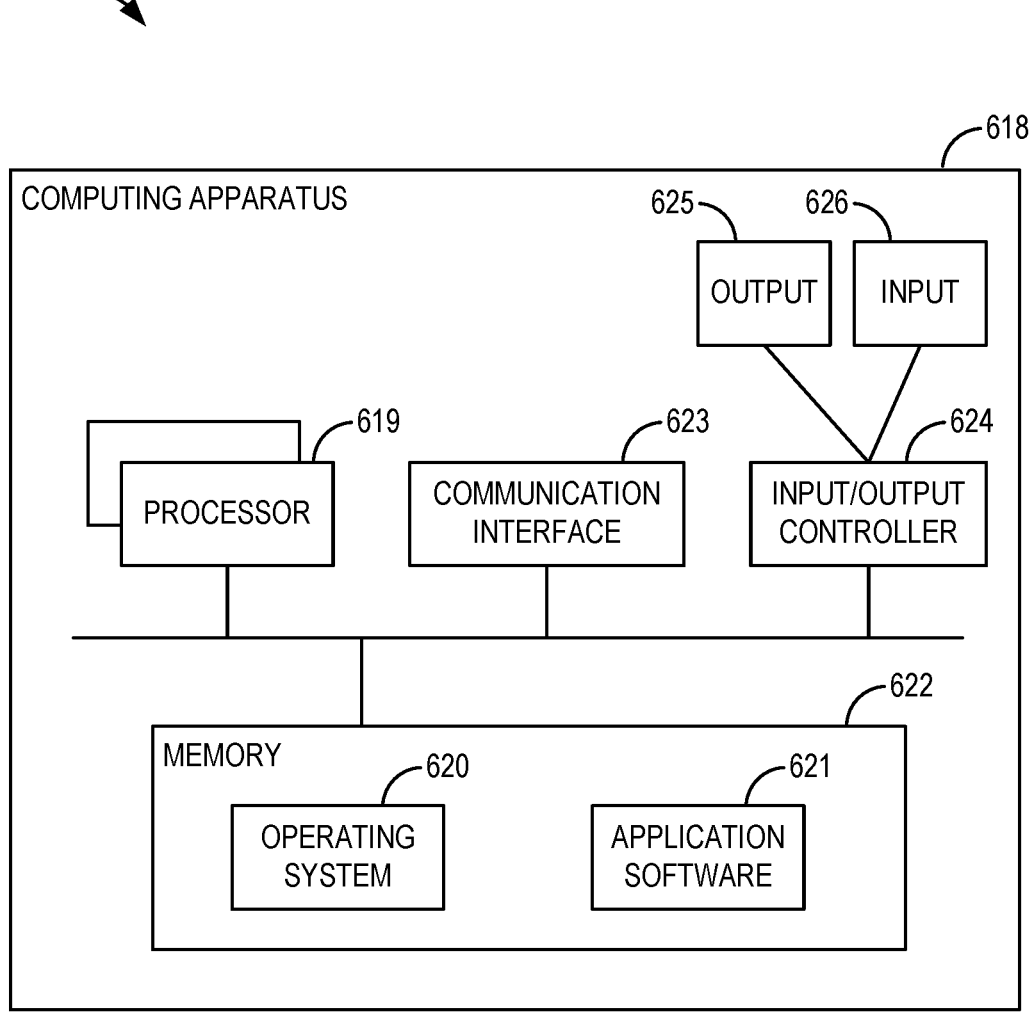
FIG. 6 illustrates a computing apparatus according to an embodiment as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 is a computing device, such as, but not limited to, the payment processor 140, the issuing bank 138, and the POS devices 112, 122 of FIG. 1.

The computing apparatus 618 comprises one or more processors 619 which can be microprocessors, controllers, or any other suitable type of processors for processing computer executable instructions to control the operation of the electronic device. Alternatively, or in addition, the processor 619 is any technology capable of executing logic or instructions, such as a hardcoded machine. In some examples, platform software comprising an operating system 620 or any other suitable platform software is provided on the apparatus 618 to enable application software 621 to be executed on the device.

In some examples, computer executable instructions are provided using any computer-readable medium or media accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 in other examples outputs data to devices other than the output device, e.g., a locally connected printing device. In some examples, a user provides input to the input device(s) 626 and/or receives output from the output device(s) 625.

The functionality described herein can be performed, at least in part, by one or more hardware logic components. The computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Additional Examples

In some examples, a system for authorizing contactless payment card transactions based on merchant location proximity is provided. The system includes at least one processor and at least one memory comprising computer-readable instructions. The at least one processor, the at least one memory and the computer-readable instructions are configured to cause the at least one processor to: identify, from a database of historical transactions, a first historical card-present transaction and a second historical card-present transaction occurring within a first time interval using the same payment card, the first historical card-present transaction occurring at a first merchant location, the second historical card-present transaction occurring at a second merchant location; create a merchant proximity pair that includes the first merchant location and the second merchant location based on the identifying; authorize a first card-present payment card transaction using a first payment card at the first merchant location; receive, from the second merchant location, a payment card authorization request message for a contactless payment card transaction using the first payment card; and authorize the contactless payment card transaction when the first merchant location and the second merchant location are in the merchant proximity pair and when the contactless payment card transaction occurs within a second time interval of the first card-present payment card transaction, thereby avoiding a decline of the contactless payment card transaction.

In some examples, a computerized method for authorizing contactless payment card transactions is provided. The method includes: identifying, from a database of historical transactions, a first historical card-present transaction and a second historical card-present transaction occurring within a first time interval using the same payment card, the first historical card-present transaction occurring at a first merchant location, the second historical card-present transaction occurring at a second merchant location; creating a merchant proximity pair that includes the first merchant location and the second merchant location based on the identifying; authorizing a first card-present payment card transaction using a first payment card at the first merchant location; receiving, from the second merchant location, a payment card authorization request message for a contactless payment card transaction using the first payment card; and authorizing the contactless payment card transaction when the first merchant location and the second merchant location are in the merchant proximity pair and when the contactless payment card transaction occurs within a second time interval of the first card-present payment card transaction, thereby avoiding a decline of the contactless payment card transaction.

In some examples, a computer storage medium is provided. The computer storage medium has computer-executable instructions that, upon execution by a processor of a computer, cause the processor to at least: identify, from a database of historical transactions, a first historical card-present transaction and a second historical card-present transaction occurring within a first time interval using the same payment card, the first historical card-present transaction occurring at a first merchant location, the second historical card-present transaction occurring at a second merchant location; create a merchant proximity pair identifying the first merchant location and the second merchant location based on the identifying; authorize a first card-present payment card transaction using a first payment card at the first merchant location; receive, from the second merchant location, a payment card authorization request message for a contactless payment card transaction using the first payment card; and authorize the contactless payment card transaction based on the first merchant location and the second merchant location being in the merchant proximity pair and based on the contactless payment card transaction occurring within a second time interval of the first card-present payment card transaction, thereby avoiding a decline of the contactless payment card transaction.

Alternatively, or in addition to the other examples described herein, examples include any combination of the following:

identifying a first historical card-present transaction and a second historical card-present transaction occurring within a first time interval using the same payment card, the first historical card-present transaction occurring at a first merchant location, the second historical card-present transaction occurring at a second merchant location;

creating a merchant proximity pair that includes the first merchant location and the second merchant location based on the identifying;

authorizing a first card-present payment card transaction using a first payment card at the first merchant location;

receiving, from the second merchant location, a payment card authorization request message for a contactless payment card transaction using the first payment card;

authorizing the contactless payment card transaction when the first merchant location and the second merchant location are in the merchant proximity pair and when the contactless payment card transaction occurs within a second time interval of the first card-present payment card transaction;

computing a sum of (A) transaction amounts for contactless payment card transactions successfully completed for the first payment card during a prior timeframe and (B) a transaction amount for the contactless payment card transaction;

authorizing the contactless payment card transaction includes authorizing the contactless payment card transaction when the sum exceeds a first limit;

a first limit is configured by a cardholder associated with the first payment card;

comparing the sum to a second limit, the second limit being greater than the first limit;

authorizing a contactless payment card transaction when the sum does not exceed the second limit;

a second limit is configured by one of a payment processor and an issuing bank associated with the first payment card;

computing, for the merchant proximity pair, a total number of transaction pairs from the database of historical transactions and occurring within a predefined time period, each transaction pair being two historical card-present transactions occurring within the first time interval, using the same payment card, and at the first merchant location and second merchant location;

creating a merchant proximity pair further comprises creating the merchant proximity pair when the total number of transaction pairs exceeds a predefined threshold;

computing, for the merchant proximity pair, a total number of cards from the database of historical transactions and occurring within a predefined time period, each card being a unique payment card that has at least one transaction pair involving the first merchant location and second merchant location;

creating the merchant proximity pair when the total number of cards exceeds a predefined threshold;

causing a user interface (UI) to be displayed on a user device;

allowing a cardholder to configure contactless limits on payment cards;

a hard limit restricting contactless transactions to a daily, weekly, monthly, or customized timeframe maximum;

a soft limit that is less than a hard limit;

a soft limit that is configurable;

a soft limit that is a customizable setting that is set by one or more of cardholders, payment processors, merchant banks, issuing banks, and merchants;

merchant pairings that include two or more unique merchant locations;

merchant locations are identified by POS device ID;

merchant locations are identified by a location ID;

using historical payment card transactions to determine merchant locations that are near to each other;

using historical payment card transactions to determine merchant locations that are near to each other based on timeliness between card-present transactions of various cardholders;

analyzing card-present payment card transactions from a transaction history table to identify merchant locations that are potentially near to each other;

an analytic transaction interval being a predefined length of time between two card-present transactions using the same payment card at two different merchant locations; and a proximity transaction interval being a time interval within which two transactions using the same payment card and occurring at paired merchant locations that allows a limit to be exceeded during authorization of a transaction.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying first historical card-present transaction and a second historical card-present transaction occurring within a first time interval using the same payment card, the first historical card-present transaction occurring at a first merchant location, the second historical card-present transaction occurring at a second merchant location; means for creating a merchant proximity pair that includes the first merchant location and the second merchant location based on the identifying; means for authorizing a first card-present payment card transaction using a first payment card at the first merchant location; receiving, from the second merchant location, a payment card authorization request message for a contactless payment card transaction using the first payment card; and means for authorizing the contactless payment card transaction when the first merchant location and the second merchant location are in the merchant proximity pair and when the contactless payment card transaction occurs within a second time interval of the first card-present payment card transaction.

At least a portion of the functionality of the various elements in FIG. 1 to FIG. 6 can be performed by other elements in FIG. 1 to FIG. 6, or an entity (e.g., processor, web service, server, application program, computing device, etc.) not shown in FIG. 1 to FIG. 6.

In some examples, the operations illustrated in FIG. 4 and FIG. 5 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for authorizing contactless payment card transactions based on merchant location proximity, the system comprising:

at least one processor; and at least one memory comprising computer-readable instructions, the at least one processor, the at least one memory and the computer-readable instructions configured to cause the at least one processor to:

identify, from a database of historical transactions, a first historical card-present transaction and a second historical card-present transaction occurring within a first time interval using the same payment card, the first historical card-present transaction occurring at a first merchant location, the second historical card-present transaction occurring at a second merchant location;

perform a proximity analysis by processing timestamps associated with the first historical card-present transaction and the second historical card-present transaction, and location identifiers associated with the first merchant location and the second merchant location;

create a merchant proximity pair that includes the first merchant location and the second merchant location based on the proximity analysis;

receive, via a payment network, a request to authorize a first card-present payment card transaction using a first payment card at the first merchant location and authorize the request;

receive, via the payment network, from the second merchant location, a payment card authorization request message for a contactless payment card transaction using the first payment card; and minimize computational processing load and network traffic on the payment network and eliminate duplicate transaction authorization attempts by authorizing the contactless payment card transaction when the first merchant location and the second merchant location are in the merchant proximity pair, when the contactless payment card transaction occurs within a second time interval of the first card-present payment card transaction, and when the contactless payment card transaction exceeds a soft contactless limit, avoiding a decline of the contactless payment card transaction.

2. The system of claim 1, wherein the computer-readable instructions are further configured to cause the at least one processor to:

compute a sum of (i) transaction amounts for contactless payment card transactions successfully completed for the first payment card during a prior timeframe and (ii) a transaction amount for the contactless payment card transaction, wherein authorizing the contactless payment card transaction further comprises authorizing the contactless payment card transaction when the sum exceeds a soft contactless limit.

3. The system of claim 1, wherein a merchant proximity pair is created when a time interval between the first historical card-present transaction and the second historical card-present transaction is within a threshold time interval.

4. The system of claim 2, wherein the computer-readable instructions are further configured to cause the at least one processor to:

compare the sum to a hard contactless limit, the hard contactless limit being greater than the soft contactless limit, wherein authorizing the contactless payment card transaction further comprises authorizing the contactless payment card transaction when the sum does not exceed the hard contactless limit.

5. The system of claim 4, wherein the hard contactless limit is configured by one of a payment processor and an issuing bank associated with the first payment card.

6. The system of claim 1, wherein the computer-readable instructions are further configured to cause the at least one processor to:

compute, for the merchant proximity pair, a total number of transaction pairs from the database of historical transactions and occurring within a predefined time period, each transaction pair being two historical card-present transactions occurring within the first time interval, using the same payment card, and at the first merchant location and second merchant location, wherein creating the merchant proximity pair further comprises creating the merchant proximity pair when the total number of transaction pairs exceeds a predefined threshold.

7. The system of claim 1, wherein the computer-readable instructions are further configured to cause the at least one processor to:

compute, for the merchant proximity pair, a total number of cards from the database of historical transactions and occurring within a predefined time period, each card being a unique payment card that has at least one transaction pair involving the first merchant location and second merchant location, wherein creating the merchant proximity pair further comprises creating the merchant proximity pair when the total number of cards exceeds a predefined threshold.

8. A computerized method for authorizing contactless payment card transactions, the method comprising:

identifying, from a database of historical transactions, a first historical card-present transaction and a second historical card-present transaction occurring within a first time interval using the same payment card, the first historical card-present transaction occurring at a first merchant location, the second historical card-present transaction occurring at a second merchant location;

performing a proximity analysis by processing timestamps associated with the first historical card-present transaction and the second historical card-present transaction, and location identifiers associated with the first merchant location and the second merchant location;

creating a merchant proximity pair that includes the first merchant location and the second merchant location based on the proximity analysis;

receiving, via a payment network, a request to authorize a first card-present payment card transaction using a first payment card at the first merchant location and authorizing the request;

receiving, via the payment network, from the second merchant location, a payment card authorization request message for a contactless payment card transaction using the first payment card; and minimizing computational processing load and network traffic on the payment network and eliminating duplicate transaction authorization attempts by authorizing the contactless payment card transaction when the first merchant location and the second merchant location are in the merchant proximity pair, when the contactless payment card transaction occurs within a second time interval of the first card-present payment card transaction, and when the contactless payment card transaction exceeds a soft contactless limit, and avoiding a decline of the contactless payment card transaction.

9. The computerized method of claim 8, further comprising:

computing a sum of (i) transaction amounts for contactless payment card transactions successfully completed for the first payment card during a prior timeframe and (ii) a transaction amount for the contactless payment card transaction, wherein authorizing the contactless payment card transaction further comprises authorizing the contactless payment card transaction when the sum exceeds the soft contactless limit.

10. The computerized method of claim 8, wherein a merchant proximity pair is created when a time interval between the first historical card-present transaction and the second historical card-present transaction is within a threshold time interval.

11. The computerized method of claim 9, further comprising:

comparing the sum to a hard contactless limit, the hard contactless limit being greater than the soft contactless limit, wherein authorizing the contactless payment card transaction further comprises authorizing the contactless payment card transaction when the sum does not exceed the hard contactless limit.

12. The computerized method of claim 11, wherein the hard contactless limit is configured by one of a payment processor and an issuing bank associated with the first payment card.

13. The computerized method of claim 8, further comprising:

computing, for the merchant proximity pair, a total number of transaction pairs from the database of historical transactions and occurring within a predefined time period, each transaction pair being two historical card-present transactions occurring within the first time interval, using the same payment card, and at the first merchant location and second merchant location, wherein creating the merchant proximity pair further comprises creating the merchant proximity pair when the total number of transaction pairs exceeds a predefined threshold.

14. The computerized method of claim 8, further comprising:

computing, for the merchant proximity pair, a total number of cards from the database of historical transactions and occurring within a predefined time period, each card being a unique payment card that has at least one transaction pair involving the first merchant location and second merchant location, wherein creating the merchant proximity pair further comprises creating the merchant proximity pair when the total number of cards exceeds a predefined threshold.

15. A computer storage medium having computer-executable instructions that, upon execution by a processor of a computer, cause the processor to at least:

identify, from a database of historical transactions, a first historical card-present transaction and a second historical card-present transaction occurring within a first time interval using the same payment card, the first historical card-present transaction occurring at a first merchant location, the second historical card-present transaction occurring at a second merchant location;

perform a proximity analysis by processing timestamps associated with the first historical card-present transaction and the second historical card-present transaction, and location identifiers associated with the first merchant location and the second merchant location;

create a merchant proximity pair identifying the first merchant location and the second merchant location based on the proximity analysis identifying;

receive, via a payment network, a request to authorize a first card-present payment card transaction using a first payment card at the first merchant location;

receive, via a payment network, from the second merchant location, a payment card authorization request message for a contactless payment card transaction using the first payment card; and minimize computational processing load and network traffic on the payment network and eliminate duplicate transaction authorization attempts by authorizing the contactless payment card transaction when the contactless payment card transaction exceeds a soft contactless limit, based on the first merchant location and the second merchant location being in the merchant proximity pair and based on the contactless payment card transaction occurring within a second time interval of the first card-present payment card transaction, thereby avoiding a decline of the contactless payment card transaction.

16. The computer storage medium of claim 15, wherein the computer-executable instructions, when executed by a processor of the computer, cause the computer to:

compute a sum of (i) transaction amounts for contactless payment card transactions successfully completed for the first payment card during a prior timeframe and (ii) a transaction amount for the contactless payment card transaction, wherein authorizing the contactless payment card transaction further comprises authorizing the contactless payment card transaction when the sum exceeds the soft contactless limit.

17. The computer storage medium of claim 16, wherein the computer-executable instructions, when executed by a processor of the computer, cause the computer to:

compare the sum to a hard contactless limit, the hard contactless limit being greater than the soft contactless limit, wherein authorizing the contactless payment card transaction further comprises authorizing the contactless payment card transaction when the sum does not exceed the hard contactless limit.

18. The computer storage medium of claim 17, wherein the soft contactless limit is configurable by a cardholder associated with the first payment card, wherein the hard contactless limit is configured by one of a payment processor and an issuing bank associated with the first payment card.

19. The computer storage medium of claim 15, wherein the computer-executable instructions, when executed by a processor of the computer, cause the computer to:

compute, for the merchant proximity pair, a total number of transaction pairs from the database of historical transactions and occurring within a predefined time period, each transaction pair being two historical card-present transactions occurring within the first time interval, using the same payment card, and at the first merchant location and second merchant location, wherein creating the merchant proximity pair further comprises creating the merchant proximity pair when the total number of transaction pairs exceeds a predefined threshold.

20. The computer storage medium of claim 15, wherein the computer-executable instructions, when executed by a processor of the computer, cause the computer to:

compute, for the merchant proximity pair, a total number of cards from the database of historical transactions and occurring within a predefined time period, each card being a unique payment card that has at least one transaction pair involving the first merchant location 5 and second merchant location, wherein creating the merchant proximity pair further comprises creating the merchant proximity pair when the total number of cards exceeds a predefined threshold.

\* \* \* \* \*

10